United States Patent [19]
Faje et al.

[11] Patent Number: 5,489,223
[45] Date of Patent: Feb. 6, 1996

[54] ELECTRICAL CONNECTOR WITH TERMINAL LOCKING MEANS

[75] Inventors: Richard A. Faje, Westmont; Frank L. Geoghegan, Hinsdale; Bruce A. Peterson, Schaumburg; Paul A. Rattin, Western Springs, all of Ill.

[73] Assignee: Molex Incorporated, Lisle, Ill.

[21] Appl. No.: 324,815

[22] Filed: Oct. 17, 1994

[51] Int. Cl.⁶ .................................................. H01R 13/432
[52] U.S. Cl. ........................................................ 439/748
[58] Field of Search .................................... 439/746–749, 439/872

[56] References Cited

U.S. PATENT DOCUMENTS

| | | | |
|---|---|---|---|
| 2,762,026 | 9/1956 | Knohl | 439/748 |
| 3,178,673 | 4/1965 | Krehbiel . | |
| 3,422,394 | 1/1969 | Antes . | |
| 4,371,227 | 2/1983 | Yosimura | 439/746 |
| 4,472,017 | 9/1984 | Sian | 439/747 |
| 4,810,214 | 3/1989 | Yohn | 439/842 |
| 5,240,439 | 8/1993 | Egenolf | 439/745 |

*Primary Examiner*—Gary F. Paumen
*Attorney, Agent, or Firm*—Stephen Z. Weiss

[57] ABSTRACT

An electrical connector includes a housing having an elongated terminal-receiving cavity for insertion thereinto of a terminal in a given insertion direction. The cavity includes a constricted opening leading to a locking shoulder facing in the insertion direction. An elongated terminal is adapted to be inserted into the cavity and has a body portion with a cantilevered locking arm formed out of a side wall of the body portion. The locking arm has a fixed end joined to the side wall and a free end projecting outwardly from the side wall oblique to and opposite the insertion direction. The free end is adapted to engage the locking shoulder. The housing and terminal are constructed such that, upon insertion of the terminal into the cavity, the locking arm is biased laterally inwardly and then resiliently returned to a locking position with the free end thereof engaged with the locking shoulder. The locking arm has a first portion bent inwardly from the fixed end oblique to and opposite the insertion direction. A second portion of the locking arm is bent outwardly from a juncture with the first portion beyond the side wall to the free end of the locking arm.

11 Claims, 4 Drawing Sheets

ELECTRICAL CONNECTOR WITH TERMINAL LOCKING MEANS

FIELD OF THE INVENTION

This invention generally relates to the art of electrical connectors and, particularly, to a system for locking a terminal within a connector housing.

BACKGROUND OF THE INVENTION

Very generally, electrical connectors normally include a dielectric or insulating housing within which one or more conductive terminals are mounted. The terminals may be secured at a terminating end thereof to an electrical wire, for instance, with an opposite mating end of the terminal disposed within the housing for mating with a terminal of a complementary electrical connector. Quite often, various locking systems are provided for locking the terminals within the connector housing.

For instance, one type of locking system employs cantilevered locking arms which project outwardly from the terminals to lock the terminals in the connector housing. These locking arms cooperate with locking shoulders within a terminal insertion cavity of the housing to ensure that the terminal is in its proper inserted position and to prevent unintentional withdrawal of the terminal. The locking arms typically project outwardly from side walls of the terminal oblique to and opposite the insertion direction of the terminal, whereby the locking arms snap into engagement with the locking shoulders formed within the insertion cavity of the housing.

Locking systems of the character described above that employ cantilevered locking arms have various disadvantages or problems. One problem is encountered when the insertion cavity of the housing is constricted to a degree that is only slightly larger than the terminal itself. The result is that forces greater than are desired must be overcome to insert the terminal into the cavity. That is because the locking arms engage the constricted portion of the cavity substantially at the point where the locking arms are joined to the side walls of the terminal. The locking arm at this point is substantially fixed and very rigid, requiring excessive forces to resiliently bias the locking arm inwardly. Another disadvantage of cantilevered locking arms is that the free ends of the arms, in some instances, tend to break the locking shoulders of the housing, rather than spreading apart and locking into interior corners where the shoulders join a more substantial portion of the housing.

The present invention is directed to solving the above problems and satisfying a need for an improved locking system between electrical terminals and their respective dielectric housing.

SUMMARY OF THE INVENTION

An object, therefore, of the invention is to provide a new and improved locking means between an electrical terminal and the connector housing within which the terminal is mounted.

In the exemplary embodiment of the invention, an electrical connector includes a housing having a stamped and formed elongated terminal-receiving cavity for insertion thereinto of a terminal in a given insertion direction. The cavity includes a constricted opening leading to a locking shoulder facing in the insertion direction. An elongated terminal is adapted to be inserted into the cavity and includes a body portion with a cantilevered locking arm formed out of a side wall of the body portion. The locking arm has a fixed end joined to the side wall and a free end projecting outwardly from the side wall oblique to and opposite the insertion direction, the free end being adapted to engage the locking shoulder. The housing and terminal are constructed such that, upon insertion of the terminal into the cavity, the locking arm is biased laterally inwardly and then resiliently returned to a locking position with the free end engaged with the locking shoulder.

The invention contemplates that the locking arm includes a first portion projecting inwardly from the fixed end thereof oblique to and opposite the insertion direction. A second portion projects outwardly from a juncture with the first portion beyond the side wall of the terminal to a free end of the locking arm. Therefore, with the locking arm first projecting inwardly and then back outwardly, a greater moment arm is created at a point where the locking arm engages the constricted opening of the terminal-receiving cavity, and the insertion forces on the terminal are significantly reduced.

As disclosed in the preferred embodiment herein, the terminal is stamped and formed of sheet metal material, and the locking arm includes a first bend at the fixed end thereof and a second bend at the juncture between the first and second portions thereof. Other features of the invention include the provision of a reinforcing rib formed integral with the locking arm and extending lengthwise thereof. The distal end of the locking arm, at the free end thereof, is chamfered and is adapted to engage the locking shoulder and bias the free end laterally outwardly in response to withdrawal forces on the inserted terminal opposite the insertion direction.

The invention also contemplates a terminal with a portion of the bottom wall stamped and bent adjacent the juncture of one arm between the first and second portions whereby, in response to withdrawal forces on the inserted terminal opposite the insertion direction, the juncture and bottom wall portion will abut one another. Lastly, the invention includes a terminal having a pair of the locking arms on opposite sides of the terminal. The junctures between the first and second portions of the locking arms oppose each other and are adapted to abut each other in response to withdrawal forces on the inserted terminal opposite the insertion direction. The terminal is shown herein as a female terminal with a receptacle at a mating end thereof, with the side walls of the terminal from which the locking arms are formed defining portions of the receptacle.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figures 1, 4:
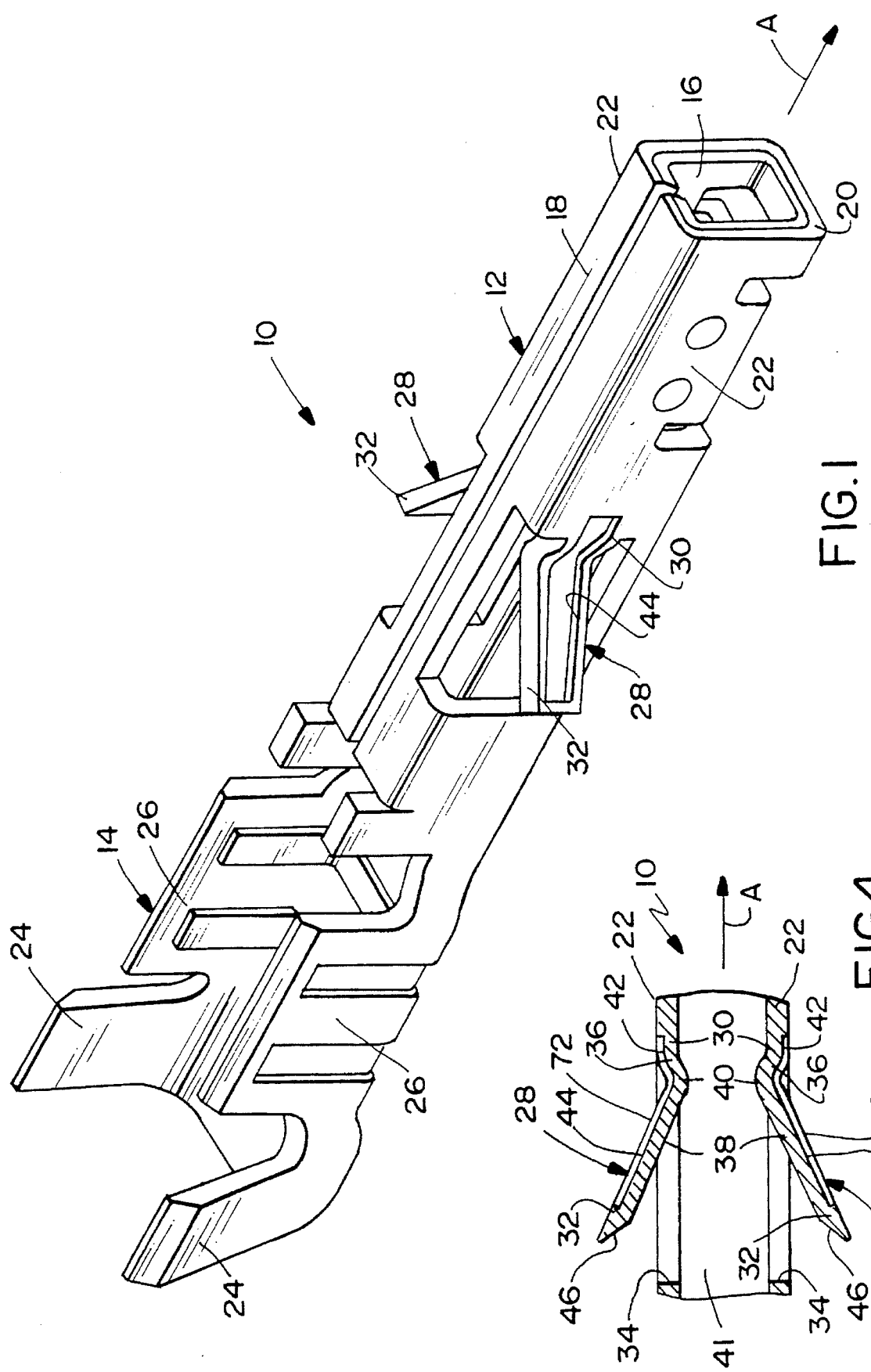
FIG. 1 is a perspective view of an elongated terminal embodying the concepts of the invention.
FIG. 4 is a section, on an enlarged scale, taken generally along line 4—4 of FIG. 3.
Figure 2:
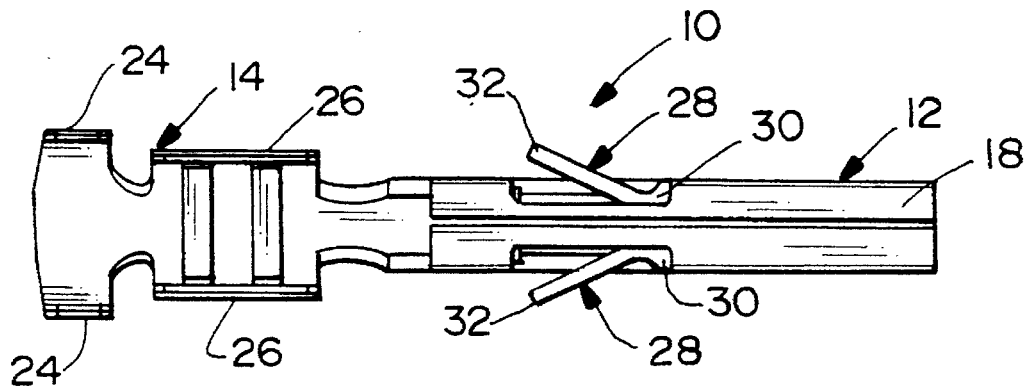
FIG. 2 is a top plan view, on a reduced scale, of the terminal of FIG. 1.
Figure 3:
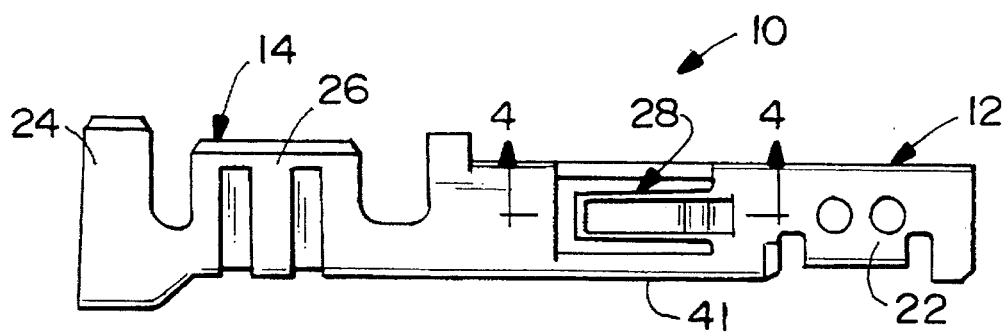
FIG. 3 is a side elevational view of the terminal.

Referring to the drawings in greater detail, and first to FIGS. 1–3, the invention is embodied in an electrical connector which includes an elongated terminal, generally designated 10, which includes a mating end, generally designated 12, and a terminating end, generally designated 14. The terminal is a unitary structure stamped and formed of conductive sheet metal material.

Terminal 10 is constructed as a female terminal, with mating end 12 formed in a box-like configuration defining a receptacle 16 for receiving a complementary male terminal, such as a terminal pin. In essence, mating end 12 defines a body having a top wall 18, a bottom wall 20 and a pair of opposite side walls 22.

Terminating end 14 of terminal 10 includes a rear pair of crimp arms 24 and a forward pair of crimp arms 26. Crimp arms 24 are adapted for crimping onto the outer insulating cladding of an insulated electrical cable. Crimp arms 14 are adapted to crimp onto the inner conductor of the cable, all of which is generally known in the electrical connector art.

Still referring to FIGS. 1–3, terminal 10 includes a pair of cantilevered locking arms, generally designated 28, formed out of side walls 22 of mating end 12 of the terminal. Referring to FIG. 4 in conjunction with FIGS. 1–3, each locking arm has a fixed end 30 joined to one of the side walls 22 and a free end 32 projecting outwardly from the respective side wall oblique to and opposite an insertion direction "A" of the terminal. As will be described in greater detail hereinafter, free ends 32 of the terminals are adapted to engage behind a pair of locking shoulders of the connector housing.

Still referring to FIG. 4 in conjunction with FIGS. 1–3, each locking arm 28 is stamped out of an opening 34 in a respective one of the side walls 22 of the terminal. Each locking arm includes a first portion 36 that projects inwardly from fixed end 30 oblique to and opposite the insertion direction "A" of the terminal. A second portion 38 projects outwardly from a juncture 40 with the first portion 36 beyond the respective side wall 22 to free end 32 of the locking arm. As stated above, terminal 10 preferably is stamped and formed of sheet metal material. Consequently, each locking arm 28 includes a first bend 42 at fixed end 30 and a second bend at juncture 40 between first and second portions 36 and 38, respectively, of the locking arm.

Lastly, each locking arm includes other features such as an indented reinforcing rib 44 formed integral therewith and extending lengthwise thereof on the outside of the arm. In addition, a chamfered distal end 46 of each locking arm 28 is formed at free end 32 thereof, for purposes to be described hereinafter.

Figure 5:
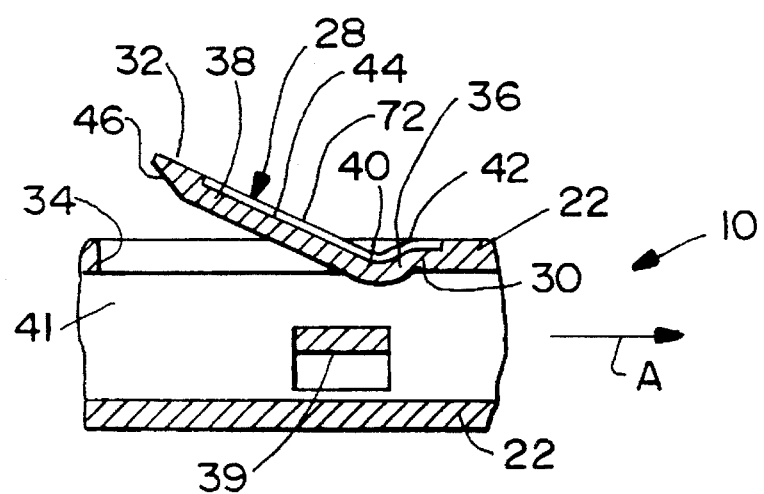
FIG. 5 is a section, on an enlarged scale, taken generally along line 4—4 of FIG. 3 showing an alternate embodiment.

FIG. 5 shows a cross section of the terminal 10 having one locking arm 28 stamped from a side wall 22. Also shown is an upstanding abutment wall 39 stamped from the bottom wall 41 adjacent the sidewall 22. As a withdrawal force is placed on the terminal, locking arm 28 tends to seat further into corner 60 (FIG. 6) of locking shoulder 58. The locking arm becomes deformed or bends inwardly to an extent that juncture or bend 40 abuts abutment wall 39.

Figure 6:
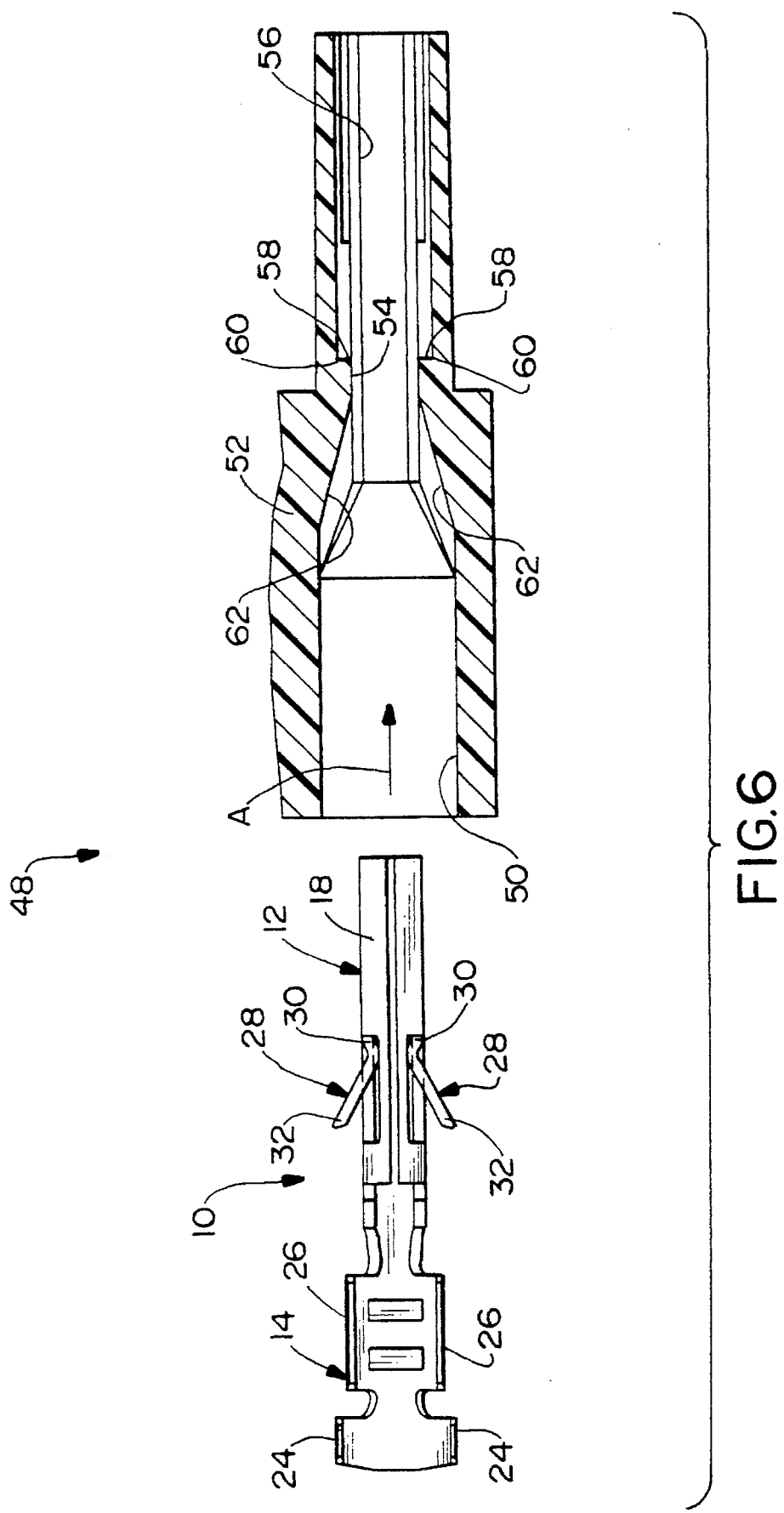
FIGS. 6–9 are sequential views of seriatim positions of insertion of the terminal into a connector housing.

Referring to FIG. 6, an electrical connector, generally designated 48, includes one or more terminals 10 insertable into one or more elongated terminal-receiving cavities 50 in a connector housing 52. Each terminal-receiving cavity has a constricted opening 54 joining a front region 56. A pair of locking shoulders 58 are defined at opposite sides of the cavity immediately forwardly of constricted opening 54. The shoulders define interior corners 60. Lastly, cavity 50 is tapered, as at 62, leading to constricted opening 54 in insertion direction "A" of terminal 10.

Figure 7:
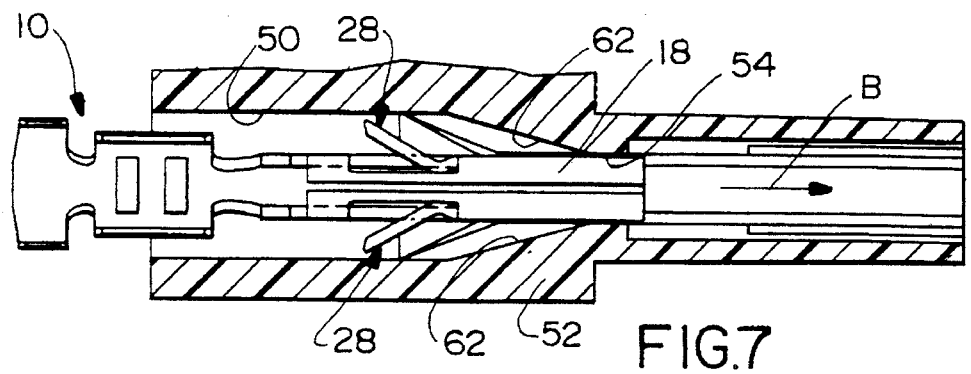
Figure 8:
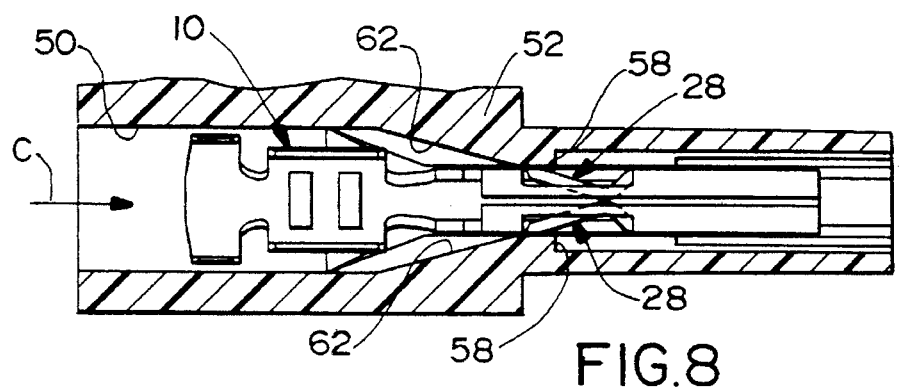
Figure 9:
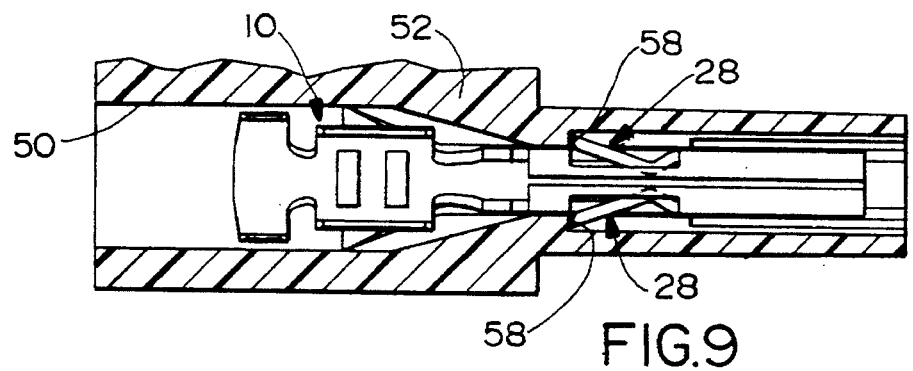

Referring to FIGS. 7–9 in conjunction with FIG. 5, terminal 10 is inserted into cavity 50 in the insertion direction indicated by arrow "A" in FIG. 5. Initially, the forward mating end 18 of the terminal passes through constricted opening 54 in the direction of arrow "B" as shown in FIG. 7, arrow "B" corresponding to the insertion direction "A" of the terminal.

Upon further insertion of the terminal into the cavity, locking arms 28 will begin to engage tapered portions 62 of cavity 50 which bias or compress the locking arms laterally inwardly toward each other as the locking arms pass through constricted opening 54 as seen in FIG. 8.

Further insertion of terminal 10 into cavity 50 of connector housing 52 in the direction of arrow "C" (FIG. 8) will cause the terminal to reach its fully inserted position as shown in FIG. 9. As the terminal reaches its fully inserted position, locking arms 28 will resiliently return or "snap" laterally outwardly to positions of locking engagement behind locking shoulders 58. Withdrawal movement of the terminal opposite its insertion direction now is prevented by this interengagement of the free ends of the locking arms with the locking shoulders.

Figure 10:
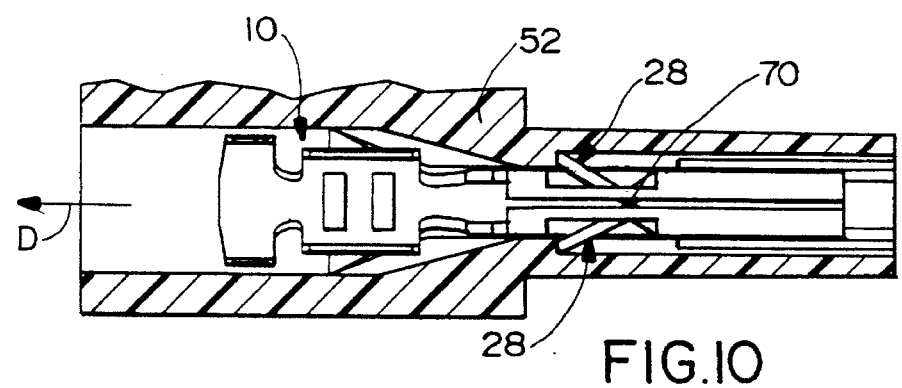
FIG. 10 is a view similar to that of FIGS. 6–9, but showing the configuration of the locking arms when withdrawal forces are applied to the terminal.

FIG. 10 shows a condition of terminal 10 when a withdrawal force is applied to the terminal in the direction of arrow "D" such as forces pulling on the electrical cable that is terminated to the terminal. When such withdrawal forces are applied to the terminal, locking arms 28 tend to seat further into corners 60 (FIG. 6) of locking shoulders 58. This is facilitated by chamfered distal ends 46 (FIG. 4) of the locking arms. In addition, it can be seen in FIG. 9 that the locking arms have been deformed or bent inwardly to an extent that junctures or bends 40 (FIG. 4) abut each other, as at 70 in FIG. 9. This abutment significantly shortens the effective moment arms of the locking arms and significantly increases the forces that would be required to pull or withdraw the terminal out of its fully inserted position.

In conclusion, an advantage of the "double-bend" locking arms 28 over the prior art can be understood by reference back to FIG. 4. In known locking systems wherein locking arms are bent outwardly immediately at their ends fixed to the side walls of the terminal, such as bending locking arms 28 outwardly immediately at fixed ends 30, it can be understood that an extremely small moment arm is created between the fixed ends of the locking arms and the points at which the locking arms would engage constricted opening 54 in connection housing 52. By providing the double-bend configuration of locking arms 28 as described above and best shown in FIG. 4, locking arms 28 engage the constricted opening at points 72 which can be seen to be spaced significantly from fixed ends 30 of the locking arms. In fact, with the depiction of FIG. 4, it can be seen that the moment arms (i.e. the distance between fixed ends 30 and points 72) are almost one-third the lengths of the locking arms. Therefore, the arms are provided with significantly increased resiliency compared to prior-art locking arms, which, in turn, desirably reduces the insertion forces on the terminal to a considerable extent.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an electrical connector which includes, a housing having an elongated terminal-receiving cavity with a rear constricted opening joining a front region, said front region having a forwardly facing locking shoulder with an interior corner adjacent the opening, and a stamped and formed elongated terminal adapted to be slidably inserted into said cavity and having a body with a pair of resiliently opposed rearwardly extending cantilevered locking arms having free ends that are normally spaced apart a distance that is greater than a given width of the opening, whereby, when said terminal is inserted into said cavity, said locking arms are compressed toward each other, so that the terminal can pass through the opening, and are resiliently returned when reaching the front region to define an inserted position, said free ends of the arms engaging said shoulder to resist a rearward terminal withdrawal force when said terminal is in its inserted position, wherein the improvement comprises:
each locking arm including,
a first portion pivotally extending inwardly into the body, and
a second portion pivotally extending from a juncture with said first portion outwardly from said body,
the junctures of both arms being normally spaced apart,
whereby, when a rearward withdrawal force is applied to the terminal in its inserted position, said junctures move inwardly toward each other until they touch while the free ends move outwardly from the body forcing the free ends into the interior corner of said locking shoulder and allowing a larger force to be applied without causing buckling of the arms.

2. In an electrical connector as set forth in claim 1, wherein said locking arms include reinforcing ribs formed integral therewith and extending lengthwise thereof.

3. In an electrical connector as set forth in claim 1, wherein distal ends of the locking arms at the free ends thereof are chamfered and adapted to engage said locking shoulders and bias the free ends laterally outwardly in response to withdrawal forces on the inserted terminal.

4. In an electrical connector as set forth in claim 1, wherein said terminal is a female terminal with a receptacle at a mating end thereof, said body forming the receptacle.

5. In an electrical connector which includes a housing having an elongated terminal-receiving cavity for insertion thereinto of a terminal in a given insertion direction, the cavity including a constricted opening leading to locking shoulders facing in said direction, and a stamped elongated terminal adapted to be inserted into said cavity and having a body portion with cantilevered locking arms formed out of opposite side walls of the body portion, the locking arms each having a fixed end joined to the respective side wall and a free end projecting outwardly from the side wall oblique to and opposite said insertion direction and adapted to engage the respective locking shoulder, the housing and terminal being constructed such that, upon insertion of the terminal into the cavity, the locking arms are biased laterally inwardly and then resiliently returned to a locking position with the free ends thereof engaged with the locking shoulders, wherein the improvement comprises:
said locking arms each having a first portion projecting inwardly from the respective fixed end oblique to and opposite said insertion direction, and a second portion projecting outwardly from a juncture with the first portion beyond the respective side wall to said free end of the locking arm, the junctures between the first and second portions of the locking arms opposing each other and adapted to abut each other in response to withdrawal forces on the inserted terminal opposite said insertion direction.

6. In an electrical connector as set forth in claim 5, wherein each said locking arm includes a first bend at the fixed end thereof and a second bend at the juncture between said first and second portions thereof.

7. In an electrical connector as set forth in claim 5, wherein each said locking arm includes a reinforcing rib formed integral therewith and extending lengthwise thereof.

8. In an electrical connector as set forth in claim 5, wherein a distal end of each the locking arm at said free end thereof is chamfered and is adapted to engage the respective locking shoulder and bias the free end laterally outwardly in response to withdrawal forces on the inserted terminal opposite said insertion direction.

9. In an electrical connector as set forth in claim 5, wherein a distal end of each locking arm at said free end thereof is chamfered and is adapted to engage the respective locking shoulder and bias the free end laterally outwardly in response to withdrawal forces on the inserted terminal opposite said insertion direction.

10. In an electrical connector as set forth in claim 5, wherein said terminal is a female terminal with a receptacle at a mating end thereof, said side walls forming a part of the receptacle.

11. In an electrical connector which includes a housing having an elongated terminal-receiving cavity for insertion thereinto of a terminal in a given insertion direction, the cavity including a constricted opening leading to a locking shoulder facing in said direction, and a stamped elongated terminal adapted to be inserted into said cavity and having a body portion with a cantilevered locking arm formed out of a side wall of the body portion, the locking arm having a fixed end joined to the side wall and a free end projecting outwardly from the side wall oblique to and opposite said insertion direction and adapted to engage said locking shoulder, the housing and terminal being constructed such that, upon insertion of the terminal into the cavity, the locking arm is biased laterally inwardly and then resiliently returned to a locking position with the free end thereof engaged with the locking shoulder, wherein the improvement comprises:
said locking arm having a first portion projecting inwardly from said fixed end oblique to and opposite said insertion direction, and a second portion projecting outwardly from a juncture with the first portion beyond said side wall to said free end of the locking arm, said locking arm further including a first bend at the fixed end thereof, a second bend at the juncture between said first and second portions thereof, and a reinforcing rib formed integral therewith and extending lengthwise thereof, wherein a portion of a terminal wall adjacent said sidewall is stamped to form an abutment wall extending perpendicularly from the terminal wall adjacent the sidewall to abut said juncture in response to withdrawal forces on the inserted terminal opposite said insertion direction.

* * * * *